United States Patent [19]

Zima et al.

[11] 4,366,282

[45] Dec. 28, 1982

[54] AQUEOUS COATING COMPOSITIONS FOR WOOD SURFACES

[75] Inventors: Herbert Zima; Laszlo Tulacs, both of Graz, Austria

[73] Assignee: Vianova Kunstharz, A.G., Werndorf, Austria

[21] Appl. No.: 204,158

[22] Filed: Nov. 5, 1980

[30] Foreign Application Priority Data

Nov. 9, 1979 [AT] Austria ................................ 7193/79

[51] Int. Cl.³ .............................................. C08K 5/10
[52] U.S. Cl. ..................................... 524/317; 523/408
[58] Field of Search ................... 260/29.6 TA, 29.6 T, 260/31.2 N, 31.4 R, 31.4 EP, 31.6; 524/317; 523/408

[56] References Cited

U.S. PATENT DOCUMENTS 3,637,546  1/1972  Parker ................................. 260/31.6
3,753,958  8/1973  Wingler et al. ..................... 260/31.6
3,781,380 12/1973  Labana et al. ................. 260/31.4 EP
4,120,839 10/1978  Emmons et al. ........... 260/31.45 EP Primary Examiner—Joseph L. Schofer
Assistant Examiner—N. Sarofim Attorney, Agent, or Firm—A. W. Breiner

[57] ABSTRACT

Polymer dispersions characterized in that they contain N-methylol(meth)acrylamide groups, comprising
  30–65% by weight of methylmethacrylate,
  10–17% by weight of ethylacrylate,
  10–30% by weight of butylmethacrylate,
  5–20% by weight of styrene,
  3–10% by weight of N-methylol(meth)acrylamide, and containing as a coalescing agent from about 5 to 15% by weight, based on the dispersion, of a blend comprising
  20–65% by weight of a high boiling paint solvent such as 2,2,4-trimethylpentane-1,5-diol-mono-trimethylacetate and
  80–35% by weight of ethylene glycol monoethyletheracetate, and/or ethylene glycol monobutyletheracetate, optionally in conjunction with basic varnishes based on cationic water-soluble acrylic copolymers, are described. The dispersions when used in coating compositions for coating wood surfaces provide a coating on wood having good mar resistance, hardness, and flexibility, while accentuating the wood grain and color.

10 Claims, No Drawings

AQUEOUS COATING COMPOSITIONS FOR WOOD SURFACES

This invention is directed to aqueous coating compositions. More particularly, this invention is directed to aqueous coating compositions for wood surfaces which can be used to obtain clear open and/or closed pore coatings. The coating compositions are based on polymer dispersions containing N-methylol acrylamide units. Alternatively, the dispersions containing N-methylol acrylamide units can be processed together with a paint composition based on a water-soluble acrylic copolymer.

The painting of wood with clear varnishes is described in detail in "Lehrbuch der Lacke und Beschichtungen," H. Kittel, Vol. V, pages 305-317, edition W. A. Colomb, 1977. As stated thereby, nitrocellulose lacquers (cellulose nitrate lacquers at times referred to as NC-lacquers) and acid curing alkyd-amine resin enamels, polyurethane paints and paints based on unsaturated polyesters are primarily used in varnishes for use on wood. All these coating compositions require a large amount of organic solvent for processing and application or of polymerizable monomers, which, at least in part, can have a narcotic effect. Accordingly, there is a concerned effort to obtain coating compositions based on water as a solvent, eliminating substantial environmental pollution, and where the paints correspond to nitrocellulose lacquers in performance.

Polymer dispersions containing N-methylol acrylamide units are known in the literature and have been used for various purposes. U.S. Pat. No. 3,856,734 describes the preparation of dispersions from vinylacetate, N-methylol acrylamide, and acrylic acid. The dispersions are used as adhesive for plywood. Acrylic dispersions which, in addition to the acrylates or methacrylates, can also optionally contain N-methylol acrylamide are disclosed in U.S. Pat. No. 3,790,520. The dispersions are used in the textile industry, and for the surface protection of plastics, metals, and wood. Dispersions described in Deutsche Auslegeschrift No. 10 47 431 which contain methylol acrylamide units are used for crosslinking polymer particles during production of the dispersion. Deutsche Offenlegungsschrift No. 25 35 660 describes the preparation of auto-crosslinking polymer dispersions containing methylolated carboxylic acid amides and polymer solutions wherein emulsion polymers containing acrylamide are produced which are subsequently reacted with methylolated carboxylic acid amides. These known dispersions, when stoved at the conditions applicable to wood, give coatings which do not meet the requirements for practical use from the standpoint of mar resistance, hardness and flexibility, and pile strength.

Accordingly, it is a primary object of the present invention to provide coating compositions for wood surfaces, particularly for furniture coatings, which will replace the conventional nitrocellulose lacquers and contain low levels of organic solvents.

The requirements of the furniture industry for coatings for wood applications include a short cure time at from 70°-90° C.; good hardness and mar resistance in order to allow the objects to be stacked within a short time without damage to the coated surface. Furthermore, the coating should not mask but rather should bring out the wood grain and color of the wood. Finally, the finish obtained should have enhanced resistance, particularly to water. These requirements are met by the compositions of the present invention which include polymer dispersions which contain copolymers with a high glass transition temperature, in conjunction with specifically selected coalescing agents, and provide an auto-crosslinking mechanism.

The present invention is, therefore, concerned with the use of polymer dispersions containing N-methylol acrylamide, and having the formulation:
- 30-65% by weight of methylmethacrylate;
- 10-17% by weight of ethylacrylate;
- 10-30% by weight of butylmethacrylate;
- 5-20% by weight of styrene;
- 3-10% by weight of N-methylol(meth)acrylamide, and containing as coalescing agent 5 to 15% by weight (of the dispersion) of a blend having the formulation
- 20-65% by weight of a high boiling paint solvent such as 2,2,4-trimethylpentane-1,5-diol-monotrimethylacetate, and
- 80-35% by weight of ethylene glycol monoethyletheracetate, and/or ethylene glycol monobutyletheracetate.

The compositions can optionally be utilized in conjunction with basic varnishes based on cationic water-soluble acrylic copolymers, for open pore or closed pore coatings for wood surfaces.

In a particularly advantageous embodiment of the invention the dispersions are prepared from
- 45-55% by weight of methylmethacrylate;
- 12-15% by weight of ethylacrylate;
- 15-25% by weight of butylmethacrylate;
- 5-10% by weight of styrene, and
- 7-9% by weight of N-methylol methacrylamide, with the addition of a coalescing agent (calculated on the emulsion) having the formulation
- 4-6% by weight of the mentioned high boiling paint solvent,
- 7-9% by weight of ethylene glycol monoethyletheracetate, or
- 3-5% by weight of ethylene glycol monobutyletheracetate.

The coating compositions of the invention, after drying for 5 to 10 minutes at 75° to 90° C., form coatings on wood which have excellent appearance, excellent hardness and mar resistance, and very good water resistance. The overall performance is in all cases equal to the optimum performance of a nitrocellulose lacquer, with the additional essential advantage of non-flammability and non-toxicity. The toxicity rating of the dispersions of the invention corresponds to YSAM, group 0. Furthermore, the pile strength of the coatings is excellent after a short cooling period subsequent to the curing procedure. The compositions are particularly suited for open pore coatings.

The preparation of the polymer dispersions is effected in known manner by emulsion polymerization in the presence of anionic and nonionic emulsifiers and free radical initiators. Water and the emulsifiers are charged to the polymerization reactor and heated to 85° to 88° C. The monomer blend, the Methylolmethacrylamide and the initiator solution are added from three separate addition funnels simultaneously over a period of 90 minutes. After the end of the addition, the batch is allowed to react at 88° to 90° C. for about 40 minutes.

The polymer dispersions of the invention are prepared from
- 30-65, preferably 45-55% by weight of methylmethacrylate;

rate so as to guarantee a conversion of 90% at any time of the polymerization. The polymerization is finished when, at the end of the addition, the polymer content corresponds to a conversion of 98-100%. Then, at 40°-50° C., a solution of diisopropanol amine in isopropanol is added slowly, as listed in Table 1. The exothermic reaction is monitored in order that the temperature does not exceed 80° C. After the end of the addition, a temperature of 80° to 85° C. is held for 2 hours.

TABLE 1

| Copolymer | A | B | C | D | E | F | G | H |
|---|---|---|---|---|---|---|---|---|
| Monomer Blend: | | | | | | | | |
| MMA | 60 | 70 | 60 | 70 | 60 | 50 | 50 | 60 |
| BMA | — | 10 | — | 10 | — | 10 | 10 | — |
| IMA | — | — | 20 | — | 20 | — | — | — |
| TBA | 15 | — | — | — | — | — | 20 | 20 |
| GMA | 25 | 20 | 20 | 20 | 20 | 40 | 20 | 20 |
| amine solution | | | | | | | | |
| DIPA | 23.4 | 18.7 | 18.7 | 18.7 | 18.7 | 37.5 | 18.7 | 18.7 |
| IP | 30 | 30 | 30 | 30 | 30 | 30 | 30 | 30 |

MMA: Methylmethacrylate
BMA: Butylmethacrylate
IMA: Isobutylmethacrylate
TBA: Tert.-butylacrylate
GMA: Glycidylmethacrylate
DIPA: Diisopropanolamine
IP: Isopropanol In Examples B and C tert.butylperhexanoate was used as a replacement for the azobisisobutyronitrile. The copolymers have a slightly yellow color and are infinitely dilutable with water upon neutralization with acetic acid to a pH-value of from 4 to 6.

In preparing a base paint the resin solution is neutralized with diluted acetic acid, about 30%, to a pH-value of from 5 to 6, and diluted with deionized water to a solids content of 15 to 30%.

The wood types mentioned in Example 2 were coated with a double coat system, the base coat consisting of the copolymers A-H of Table 1. The finishing coats were the dispersions of Examples 1 and 2. The base coat was applied in a quantity of about 30 g/m² and dried for 5 minutes at 85° C. The coated surface could be sanded well (emery paper No. P 320). After sanding, the top dispersion coat was applied and also cured for 5 minutes at 85° C. The coating with a thickness of 30 μm had an excellent appearance, with fine gloss and great hardness and mar resistance. The differences between the various coatings were only slight. Piled panels did not stick together, even with loads. The Buchholz test gave a result of 1.7 mm in all cases. Color and wood grain were strongly accentuated. The performance of the coatings corresponds to that of an optimum quality nitrocellulose lacquer. On water soak a slight swelling could be observed after 2 hours.

EXAMPLE 3

Substantially the same results were obtained with dispersions prepared according to the method of Example 1 from 1314 parts of deionized water, 18 parts of the sodium salt of an octylphenol reacted with 2 moles of ethylene oxide and sulfated, 12 parts of an octylphenol reacted with 16 moles of ethylene oxide and 7.2 parts of sodium vinyl sulfonate, with the following three components:

1. A monomer blend of 697 parts of methylmethacrylate, 192 parts of n-butylmethacrylate, 180 parts of ethylacrylate, and 60 parts of styrene;
2. 203 parts of a 36% aqueous solution of N-methylolmethacrylamide; and
3. a solution of 3 parts of ammonium peroxodisulfate in 90 parts of water.

The coalescing agent is a blend of 139 parts of the high boiling paint solvent used in Example 1 and 194 parts of ethylene glycol monoethyletheracetate.

As will be apparent to one skilled in the art, various modifications can be made within the scope of the aforesaid description. Such modifications being within the ability of one skilled in the art form a part of the present invention and are embraced by the appended claims.

It is claimed:

1. Polymer aqueous dispersions containing N-methylol(meth)acrylamide and comprising from about
   30-65% by weight of methylmethacrylate,
   10-17% by weight of ethylacrylate,
   10-30% by weight of butylmethacrylate,
   5-20% by weight of styrene,
   3-10% by weight of N-methylol(meth)acrylamide,
   and containing from 5 to 15% by weight coalescing agent, based on the said polymer dispersion, of a blend comprising
   20-65% by weight of a high boiling paint solvent and
   80-35% by weight of ethylene glycol monoethyletheracetate, and/or ethylene glycol monobutyletheracetate.

2. The polymer aqueous dispersions of claim 1 wherein the high boiling paint solvent is 2,2,4-trimethylpentane-1,5-diol-monotrimethylacetate.

3. Polymer aqueous dispersions containing N-methylol(meth)acrylamide and comprising from about
   45-55% by weight of methylmethacrylate,
   12-15% by weight of ethylacrylate,
   15-25% by weight of butylmethacrylate,
   5-10% by weight of styrene,
   7-9% by weight of N-methylolmethacrylamide,
   and containing from about 5 to 15% by weight coalescing agent, based on the said polymer dispersion, of a blend comprising
   4-6% by weight of a high boiling paint solvent,
   7-9% by weight of ethylene glycol monoethyletheracetate, or
   3-5% by weight of ethylene glycol monobutyletheracetate.

4. The polymer aqueous dispersions of claim 3 wherein the high boiling paint solvent is 2,2,4-trimethylpentane-1,5-diol-monotrimethylacetate.

5. A paint composition comprising the polymer dispersions of claim 2 and in addition thereto an aqueous solution of a cationic amine adduct of a copolymer carrying glycidyl groups and comprising from about
   20-40% by weight of glycidyl(meth)acrylate, and
   40-80% by weight of methyl(meth)acrylate.

6. A paint composition comprising the polymer dispersions of claim 4 and in addition thereto an aqueous solution of a cationic amine adduct of a copolymer carrying glycidyl groups and comprising from about
   20-40% by weight of glycidyl(meth)acrylate, and
   40-80% by weight of methyl(meth)acrylate.

7. The paint composition of claim 5 wherein the copolymer of said amine adduct includes up to 40% by weight of other alkyl(meth)acrylates, the homopolymers of which have a glass transition temperature of over +40° C.

8. The paint composition of claim 6 wherein the copolymer of said amine adduct includes up to 40% by weight of other alkyl(meth)acrylates, the homopolymers of which have a glass transition temperature of over +40° C.

9. The process of preparing polymer aqueous dispersions comprising the steps of
   (1) charging a reaction vessel with water, emulsifiers, and initiators, and heating said reaction charge to a temperature of approximately 75° to 90° C.;
   (2) separately and simultaneously adding to said heated reaction charge
      (a) a monomer blend comprising
         30–65% by weight of methylmethacrylate,
         10–17% by weight of ethylacrylate,
         10–30% by weight of butylmethacrylate, and
         5–20% by weight of styrene,
      (b) 3–10% by weight of N-methylol(meth)acrylamide, and
      (c) an initiator solution, said addition being completed within about 90 minutes;
   (3) adding a coalescing agent to said charge which is a blend of from about
         20–65% by weight of a high boiling paint solvent, and
         80–35% by weight of ethylene glycol monoethyletheracetate, and/or ethylene glycol monobutyletheracetate; and
   (4) continuing to heat said reaction charge to effect substantially complete polymerization.

10. The process of claim 9 wherein said high boiling paint solvent is 2,2,4-trimethylpentane-1,5-diol-mono-trimethylacetate.

* * * * *